Patented Mar. 18, 1930

1,751,342

UNITED STATES PATENT OFFICE

GIOACCHINO LEONE, OF PITTSBURGH, PENNSYLVANIA

BELT DRESSING

No Drawing.   Application filed August 4, 1928.  Serial No. 297,556.

This invention relates to a belt dressing and has for its object the production of a composition which when applied to the surface of a leather belt renders it pliable and waterproof, and increases its tractive quality.

In the preparation of the composition according to the best method now known to me I prefer to use the ingredients in approximately the following proportions:

| | |
|---|---|
| Asphalt | 525 pounds |
| White lead | 25 pounds |
| Tallow | 26 pounds |
| Paraffin | 5 pounds |
| Neat's-foot oil | 26 pounds |
| Oil of citronella | ¾ pound |

The ingredients are mixed in the order above named and during mixing are heated to a liquid state to facilitate the process.

I claim:

A belt dressing composition comprising, in proportions by weight, five hundred twenty-five pounds of asphalt, twenty-five pounds of white lead, twenty-six pounds of neat's-foot oil, twenty-six pounds of tallow, three-fourths of a pound of oil of citronella, and five pounds of paraffin.

In testimony whereof I affix my signature.

GIOACCHINO LEONE.